Sept. 27, 1955   M. J. MANNING   2,718,815
MAGNIFYING DEVICE
Filed Jan. 20, 1951
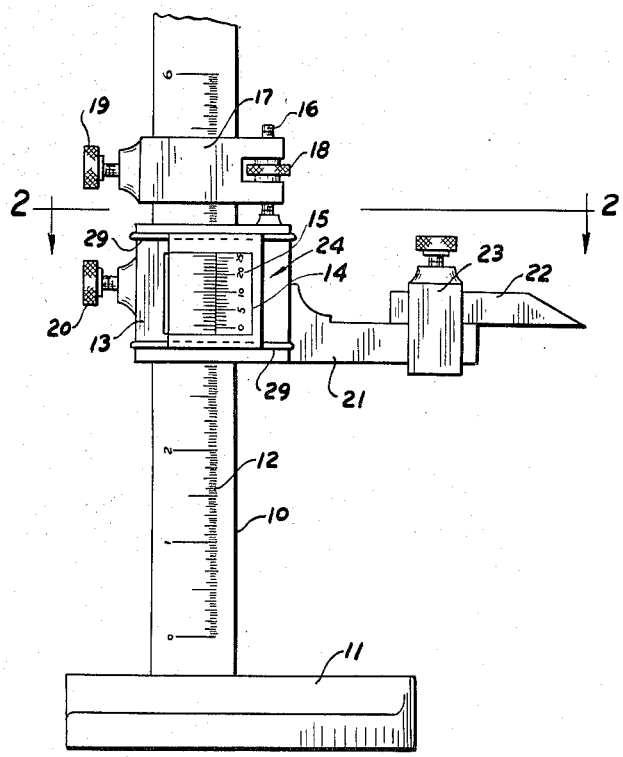
Fig. 1
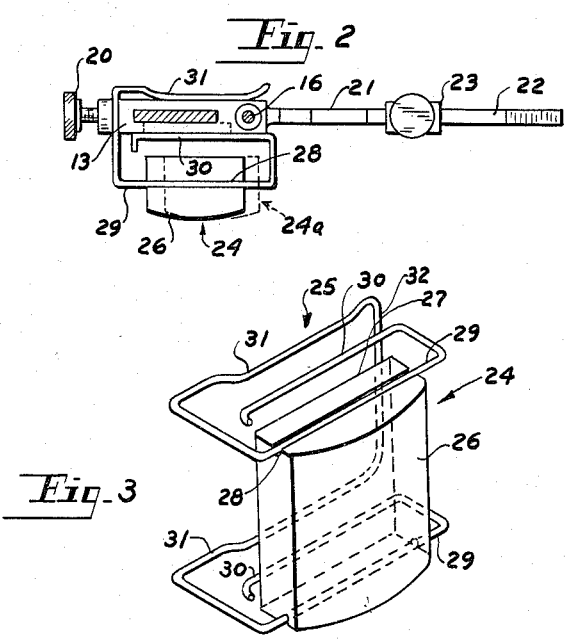
Fig. 2
Fig. 3
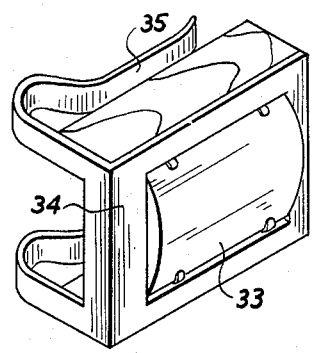
Fig. 4
INVENTOR.
MICHAEL J. MANNING
BY Louis Chayka
ATTORNEY.

United States Patent Office 2,718,815
Patented Sept. 27, 1955

2,718,815

MAGNIFYING DEVICE

Michael J. Manning, Detroit, Mich.

Application January 20, 1951, Serial No. 207,038

2 Claims. (Cl. 88—39)

The purpose of my invention is to provide a device which may be quickly applied to an instrument of the kind indicated above, which instrument includes calibrations of minute lengths or other dimensions, especially when such calibrations are spaced so close to each other that reading is difficult. In such cases my device, by enlarging the calibrations or other indices of measurements, will make the identification thereof clear and easy to discern.

Another object of my improvement is to provide a device made in such a manner that it will afford a great deal of visibility, which object I propose to obtain by eliminating all structural details which might cut off some light from calibrations to be read. The device improved by me includes as its main element a lens. It is, therefore, my object to mount the lens in such a manner that the conventional frame for the lens, which frame is ordinarily employed in devices of this kind, may be dispensed with.

A further object of my improvement is to provide a device which, because of its simple construction, may be made economically without sacrificing any features of its usefulness.

Still another object of my invention is to provide a device in which a lens forming a part of said device may be shifted laterally within its mounting for the best magnifying position of the measurements to be read.

I shall now describe my improvement with reference to the accompanying drawing in which:

Fig. 1 is a side elevational view of a height gauge with a device of my invention applied thereto;

Fig. 2 is a sectional view on line 2—2 of Fig. 1;

Fig. 3 is a perspective view of my device;

Fig. 4 is a perspective view of a modified species of my device;

Similar numerals refer to similar parts throughout the several views.

As shown in Fig. 1, my magnifying device is attached to a verneir height gauge consisting of an upright rule 10 mounted on base 11, the rule being provided with calibrations 12 in standard units of length, such as inches or centimeters. Adapted to slide longitudinally on said rule is a head, generally indicated by numeral 13, the head including on one side thereof a rectangular open frame 14 enclosing a number of calibrations on said rule 10. Disposed within the frame along the calibrated edge of rule 10 is a vernier scale 15 having graduations thereon for reading with calibrations on rule 10. Slidingly mounted on rule 10 and connected to head 13 in a spaced relation thereto by means of a screw 16 is a clamp 17. A nut 18, seated upon said screw, serves as a means of moving the head 13 longitudinally upon said rule 10. A screw 19 within the clamp 17 and a similar screw 20 in head 13 serves as means of locking the clamp and the head respectively to said rule 10. An arm 21 extending from the head transversely to the length of rule 10 is adapted to support a scriber 22, which scriber is kept in place upon said arm by means of a clamp 23.

The above is a description of a conventional vernier height gauge. I shall now describe my magnifying device which may be applied to the head of said vernier height gauge. Said device comprises a lens, generally identified by numeral 24, and a wire bracket, generally identified by numeral 25. The lens is rectangular in shape, including a convex front surface 26, said surface being defined by an arc of a circle, while the rear flat surface 27 of the lens is disposed to the chord of said arc. The top end and the lower end of the lens are each provided with a groove 28 running midway between the front and the rear surface of the lens, parallel to said rear surface 27.

The wire bracket 25 is made of one piece of wire and includes two parallel arms 29 straddling the lens from top and bottom, two integrally connected bumpers 30 disposed rearwardly of the lens in a spaced relation thereto, and two clamping bars 31 disposed substantially parallel to arms 29 rearwardly of said bumpers 30, said bars being connected by a vertical length 32 of the wire.

As above stated, arms 29 straddle the lens from the top and the bottom, one of the arms fitting into the top groove 28 of the lens while the other arm fits into the bottom groove of said lens, the arms serving as a means to hold the lens in place but permitting said lens to be moved laterally by the said arms.

For use on a vernier height gauge the bracket supporting the lens is slipped over the head 13 of the height gauge so that the lens will be held in a spaced relation to the front of said head over its frame 14, the head being clamped between the bumpers 30, which protect the lens, and bars 31, as best shown in Fig. 2. Once my device has been mounted upon head 13, as above stated, my magnifying device may be left there permanently. The lens element of my device may be shifted laterally by the arms to a position best suited for the magnification of the calibrations appearing within frame 14, both on rule 10 and on the vernier scale 15. The position of the lens shifted from its original position to the right is shown in Fig. 2 in dotted lines 24a.

The magnifying device shown in Fig. 4 includes a lens 33 held within a frame 34, and includes resilient clamping prongs 35 substantially parallel to the front of the frame and being in a spaced relation thereto. When applied to the head 13 of the vernier height gauge, such as shown in Fig. 1, the device fits over the head in a manner analogous to that shown in Fig. 2. Specifically, the head is clamped by the prongs 35 and the frame 34, the lens occupying the front portion of the frame and being in a spaced relation to said calibrations.

It is obvious that some changes may be made in my device, particularly that described in Figs. 1, 2, and 3, without departing from the inventive principle disclosed herein.

What I, therefore, wish to claim is as follows:

1. A magnifying device for use with the head of a straight rule, the head enclosing a plurality of calibrations on said rule, the device including a wire bracket, comprising two parallel bars disposed horizontally and vertically spaced from each other, the bars being adapted to engage the back portion of the head, two parallel bars disposed horizontally in front of the head and vertically spaced from each other, each of the arms being turned at one end upon itself in a hair pin turn to form a bumper disposed between the head and said arm, said bumpers and said bars serving to clamp the head therebetween, and an oblong, rectangular lens having a horizontal groove in its top edge, and a similar groove in its bottom edge, the grooves running parallel to the face of the head and being in engagement with said arms, the lens being adapted to be slidingly shifted between said arms laterally with respect to the head.

2. In combination with a head slidingly mounted upon a straight rule and enclosing a number of calibrations thereon, a magnitfying device comprising a wire bracket including two horizontal bars vertically spaced from each other and adapted to engage said head from the back, two horizontal arms integrally connected to said bars and disposed in front of the head, and two horizontally extending resilient bumpers integrally connected to said arms and being disposed between said arms and the head and forming with said bars a clamp for a frictional grip upon said head from opposite sides, and a rectangular lens having a horizontal groove in its upper edge and a similar groove in its lower edge, the grooves being in engagement with the horizontal arms to permit a sliding lateral movement of the lens in front of said head.

References Cited in the file of this patent

UNITED STATES PATENTS

| | | |
|---|---|---|
| 1,312,358 | Robinson | Aug. 5, 1919 |
| 1,667,449 | Wompner | Apr. 24, 1928 |
| 2,096,669 | Burgard | Oct. 19, 1937 |
| 2,367,872 | Kamienski | Jan. 23, 1945 |
| 2,536,625 | Button | Jan. 2, 1951 |
| 2,586,581 | Tschischeck | Feb. 19, 1952 |
| 2,604,009 | Walrath | July 22, 1952 |